Fig. 1.

AMRAM RASIEL
WILLIAM M. HENEBRY
INVENTORS

ATTORNEYS

Fig. 2A. START SIGNAL TO CLAMP

Fig. 2B. STOP SIGNAL TO CURRENT SOURCE

Fig. 2C. READ PRE-AMP OUTPUT

Fig. 2D. READ GATE CLOSED (CLAMPED) — READ GATE OPENED (UNCLAMPED) — READ GATE AND RESET LOGIC DRIVES FROM TIMER

Fig. 2E. OUTPUT TO AMP

Fig. 2F. DRIVE TO DELAY NODE

Fig. 2G. TIMER TUNNEL DIODE "ON"

Fig. 2H. DRIVE TO DEAD TIMER

Fig. 2I. DRIVE TO RESET LOGIC FROM DEAD TIMER — DEAD TIME

Fig. 2J. RESET OUTPUT FROM RESET LOGIC

AMRAM RASIEL
WILLIAM M. HENEBRY
INVENTORS

United States Patent Office

3,421,113
Patented Jan. 7, 1969

1

3,421,113
TIME-TO-AMPLITUDE CONVERTER SYSTEM
Amram Rasiel, Rockport, and William M. Henebry,
Marblehead, Mass., assignors, by mesne assignments, to EG&G, Inc., Bedford, Mass., a corporation of Massachusetts
Filed Jan. 6, 1966, Ser. No. 519,037
U.S. Cl. 332—1      19 Claims
Int. Cl. H03c 1/50

ABSTRACT OF THE DISCLOSURE

A system for converting the time intervals between a pair of randomly occurring, short-lived signals to a voltage proportional to the time interval between the signals utilizing the first input signal to enable the second signal input circuit and to initiate an interval timing sequence to allow the output of a conversion means to appear at the output of the system. The system also provides for the analog storage of a converted signal by the conversion means together with sensing means for detecting the absence of a timely stop signal as well as reset logic to drive both input means to reset.

---

The present invention relates generally to time-to-amplitude converter systems and, more particularly, to a time-to-amplitude converter system of the electronic variety for converting time intervals associated with randomly occurring short-lived events, such as nuclear events, to a voltage whose amplitude is representative of the measured time interval.

Heretofore available time-to-amplitude converters required considerable external logic to perform adequate conversion of time intervals associated with such randomly occurring short-lived events. Moreover, these prior art converters have, for the most part, ignored environmental conditions with consequent disadvantages. Furthermore, they were subject to systematic errors occasioned by widely varying operating conditions, failed to suppress readout in the event of overflow, or have not provided for delay of readout to allow independent evaluation of the initiating events to determine if readout should be done.

The invention is particularly concerned with providing a time-to-amplitude converter system which incorporates an automatic suppression of readout in the absence of a timely stop signal and also an analog memory which permits delay of readout to allow time for independent evaluation of initiating events. Furthermore, the time-to-amplitude converter system of the invention provides good differential and integral linearity, stability, freedom from systematic errors, and high resolution over a wide range of operational conditions. Moreover, the time-to-amplitude converter system of the invention minimizes spectrum distortion due to high instantaneous input rates and conversion rate inadequacies in the multichannel pulse-height analyzer, which may be used to accumulate and analyze the data at the output of the system. Also, the time-to-amplitude converter system of the invention provides two-way communication between the system and the multichannel pulse-height analyzer with which it may be used to prevent operation of the converter system during the time that the pulse-height analyzer is operating on the previous readout and to allow directed operation of the pulse-height analyzer by the converter system.

To perform the conversions of time intervals associated with randomly occurring short-lived events according to the invention, the time-to-amplitude converter system is designed around a highly stable, constant current source which, during such time intervals, charges a precision timing capacitor that is otherwise normally clamped to ground or a reference voltage by a high performance operational amplifier having non-linear feedback. This clamping means is an adapted version of the "Electronic Clamp" disclosed by the same inventors in co-pending application, S.N. 507,871, filed Nov. 15, 1965.

It is, therefore, an object of the present invention to provide a time-to-amplitude converter system that possesses good differential and integral linearity, stability, freedom from systematic errors, and which incorporates an automatic suppression of readout in the presence of an overflow and an analog memory which permits delay of readout of conversion information to allow time for independent assessment of the initiating events to determine if readout should be allowed.

Another object of the invention is to provide a time-to-amplitude converter system that is completely free from start-stop ambiguity and which minimizes spectrum distortion due to high instantaneous input rates and conversion rate inadequacies in the multichannel pulse-height analyzer used to accumulate the data from the output of the system.

It is another object of the present invention to provide a time-to-amplitude converter system that has means for two-way communication between the system and a multichannel pulse-height analyzer with which it may be used, to prevent operation of the converter system while the analyzer is still operating on the previous readout.

Other and further objects and advantages of the present invention will in part be obvious and will in part be apparent from the following detailed description, the accompanying drawings, and the appended claims.

The invention accordingly comprises the time-to-amplitude converter system possessing the construction, combination of elements, and arrangement of parts which are exemplified in the following detailed disclosure and the scope of which will be indicated in the appended claims.

In general, the time-to-amplitude converter system of the invention comprises: a means for converting a time interval to a voltage; first and second input means operatively connected to the conversion means; means actuated by the first input means to enable the second input means; means for initiating an internal timing sequence to allow the output of the conversion means to appear at the output of the converter system; means interposed between the last mentioned means and the conversion means for allowing analog storage of a converted signal by the conversion means; sensing means for detecting the absence of a timely stop signal; and reset logic means for driving the first and second input means to reset.

For a fuller understanding of the nature and objects of the invention, reference should be had to the following detailed description, taken in connection with the accompanying drawings wherein.

GENERAL DESCRIPTION

It will be helpful in view of the relatively large number of circuits involved, to outline briefly the overall function-

Conversion

Referring to FIGS. 1, 2A–2J, and 3, the time-to-amplitude converter system is designed around conversion circuit 50 whose function it is to convert a time interval associated with two randomly occurring events to a voltage whose amplitude is representative of that time interval. Basically, conversion circuit 50 comprises constant current source 52, precision timing conversion capacitor 54, and clamp circuit 56. Clamp circuit 56 is connected to the junction of source 52 and capacitor 54. This junction is denoted as "clamp node" 50b in FIG. 3. Clamp circuit 56 clamps conversion capacitor 54 to ground or other desired reference voltage. As more fully explained in applicants' co-pending application entitled "Electronic Clamp," S.N. 507,871, filed Nov. 15, 1965, clamp circuit 56 comprises high performance operational amplifier 53 and non-linear feedback loop 55. Normally closed electronic switch 57 maintains operational amplifier 53 in an enabled condition effectively to connect clamp node 50b either to ground or to a desired reference voltage to which the positive input terminal of amplifier 53, may be referenced. Consequently, conversion capacitor 54 is maintained at either ground potential or the selected reference voltage even though highly stable constant current source 52 continuously supplies current to clamp node 50b. When a start input signal is received through lead 10b from start latch 10, responsive to a valid start input on lead 10a, electronic switch 57 opens, thereby effectively preventing operational amplifier 53 from clamping clamp node 50b to ground or the selected reference voltage and permitting constant current source 52 to commence charging conversion capacitor 54. Upon receipt of a stop input signal via lead 20b from stop latch 20, another electronic switch 59, also normally closed, opens, effectively turning off constant current source 52. The voltage to which conversion capacitor 54 charges is therefore proportional to the elapsed time between the receipt of a valid start signal and the receipt of a valid stop signal and is inversely proportional to the capacitance of capacitor 54.

Analog storage

Figure 2A:
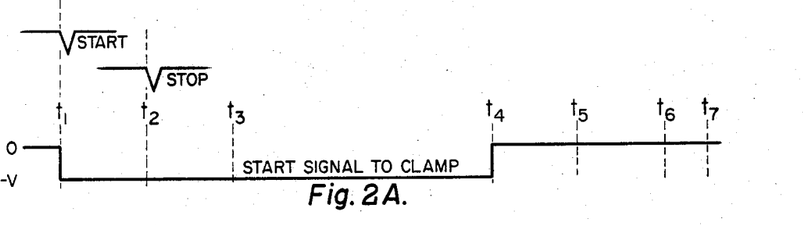
FIGS. 2A–2J depict several signals occurring at various selected points in the time-to-amplitude converter system and are shown in time relationship to one another to facilitate understanding of the operation of the system of the invention.
Figure 2B:
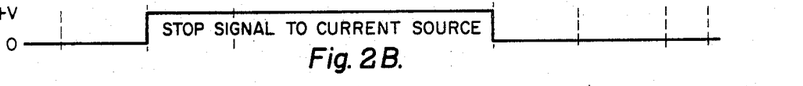
Figure 2C:
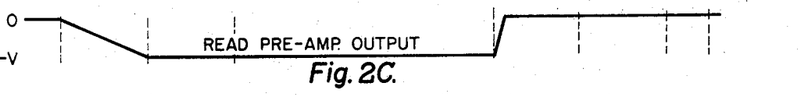

The voltage on conversion capacitor 54 is read out continuously by high input-impedance, broadband read preamplifier 60 which has the output signal illustrated in FIG. 2C. Since read preamplifier 60 is a high input-impedance and low output-impedance amplifier, it in fact permits analog storage of the converted signal on conversion capacitor 54 long enough to allow independent evaluation of the events which initiated the conversion process. The combination of read preamplifier 60 with conversion circuit 50 therefore serves as an analog memory built into the system.

Stop enable

The system cannot receive a valid stop input until after a valid start input has been received by start latch 10 since stop latch 20 is inoperative to transmit a signal until enabled by enable amplifier 14 responding to a valid start input received on lead 10d. The system, therefore, is free from any start-stop ambiguity.

Readout suppression

If a timely stop signal is not received by conversion circuit 50, the voltage on conversion capacitor 54 continues to increase until it reaches a predetermined value, which may be arbitrarily set at any value and is preferably set to about 120 percent of full scale. At that time, read preamplifier 60 actuates overrun detector 61 which initiates a reset sequence through reset logic 100 and reset amplifiers 121 and 122, thereby preventing a readout from occurring and also restoring conversion capacitor 54 to its pre-conversion condition, i.e., clamped either to ground or to the selected reference voltage. Thus, the system of the invention is also provided with built-in automatic suppression of readout in the event of an overflow which might otherwise damage the system. Also, any large amplitude over-range signals which would otherwise take a long time to analyze are prevented from being read out.

Dump sense amplifier

In the event of such an overflow, start and stop latches 10 and 20 are driven to reset by reset logic 100 and reset amplifiers 121 and 122, and are not released from their reset condition until a signal is no longer generated by dump sense amplifier 51, indicating that an imbalance condition on conversion capacitor 54 no longer exists. That is, dump sense amplifier 51 will continue to generate a signal whenever the voltage on conversion capacitor 54 is other than the selected predetermined reference voltage or ground to which clamp circuit 56 has been referenced. It must be pointed out that the output of dump sense amplifier 51, in and of itself, is insufficient to cause reset logic 100 and reset amplifiers 121 and 122 to drive start and stop latches 10 and 20 to reset, but is sufficient to hold latches 10 and 20 in the reset state through reset logic 100 and reset amplifiers 121 and 122 for as long as it may persist responsive to an imbalance on conversion capacitor 54.

Reset logic

In order to minimize spectrum distortion due to rate effects, the control logic which is built into the converter system of the invention is preferably what is commonly called 100 megacycle logic. Reset logic 100 functions to drive start and stop latches 10 and 20 to reset through reset amplifiers 121 and 122 at the end of the readout interval and maintains them in the reset condition until after the expiration of a selected dead time interval, FIG. 2I, as generated by dead timer 90, and until after conversion capacitor 54 is clamped to ground or to the selected reference voltage as sensed by dump sense amplifier 51, previously explained above. This dead time interval which follows the readout interval is provided to allow the multichannel pulse-height analyzer used with the system sufficient time to become insensitive to the receipt of further information from the system, thus minimizing or preventing pile-up effects at the output of the system. Release from the reset condition after this dead time interval occurs simultaneously at both start and stop latches 10 and 20. Start and stop latches 10 and 20 are then ready to receive another set of start and stop signals. However, if readout has commenced reset is prevented by a signal supplied by read gate timer 80 on lead 80b.

Timing system

High input-impedance, broadband read preamplifier 60, which continuously reads the voltage on conversion capacitor 54, is followed by zero-offset read gate 70 that is controlled by read gate timer 80. Read gate timer 80 generates the signal illustrated in FIG. 2D, which unclamps and thus opens read gate 70 for a predetermined selected interval, commencing after the initiation of an internal timing sequence responsive to the reception of a valid stop input signal 20a by stop latch 20 and passed through amplifier 16 and delay 18 to read gate timer 80. With read gate 70 unclamped, and hence open, the conversion signal is permitted to pass from read preamplifier 60 to output amplifiers 71 and 73. Since read preamplifier 60 is a high input-impedance and low output-impedance broadband amplifier, output amplifiers 71 and 73 receive the conversion signal, shown in FIG. 2E, from very low impedance voltage sources.

Two-way communication

The time-to-amplitude converter system of the invention is further provided with two-way communication between the system and the multichannel pulse-height analyzer with which it may be used. This is accomplished by means of cycle gate 110 and inhibit/reset 111. Inhibit/reset 111 provides for external gating and allows the time-to-amplitude converter system to be gated or reset at any time except during the readout interval. Cycle gate 110 is actuated by a valid start signal from amplifier 12 and continues functioning throughout the entire conversion cycle until the time-to-amplitude converter system is released from the reset condition at the end of the conversion readout process. Cycle gate 110 provides an operational dead time signal for the time-to-amplitude converter system and therefore may be used to slave the multichannel pulse-height analyzer or other experimental equipment to the operation of the time-to-amplitude converter system. The most obvious application of inhibit/reset 111 is to use the dead time signal from the multichannel pulse-height analyzer to control the operation of the time-to-amplitude converter. Connection of the dead time signal from the analyzer to the system via inhibit/reset 111 will insure that the system of the invention will not begin another conversion sequence until the analyzer has completely processed the previous system output with which it has been presented.

DETAILED DESCRIPTION

General

As disclosed, the time-to-amplitude converter system of the invention is adapted to convert a time interval associated with randomly occurring short-lived events, such as nuclear events, to a voltage whose amplitude is representative of the time interval in such a manner that besides providing good differential and integral linearity, stability, and high resolution over a wide range of operating conditions, the system also incorporates numerous advantages over the prior art, in particular, by incorporating an automatic suppression of readout in the event of overflow and an analog memory which permits delay of readout to allow independent evaluation of the initiating events.

With reference to the detailed system operation and the numerous individual circuits that comprise the preferred embodiment of the system, it is pointed out that like reference characters have been used to refer to like parts throughout the several drawings. It must also be pointed out that many other variatons in the individual circuits may equally well be employed in the system of the invention and that such alternate circuits will readily suggest themselves to those skilled in the art for performing identical functions in the system as hereinbelow described.

START OPERATION

Start latch 10

Figure 4A:
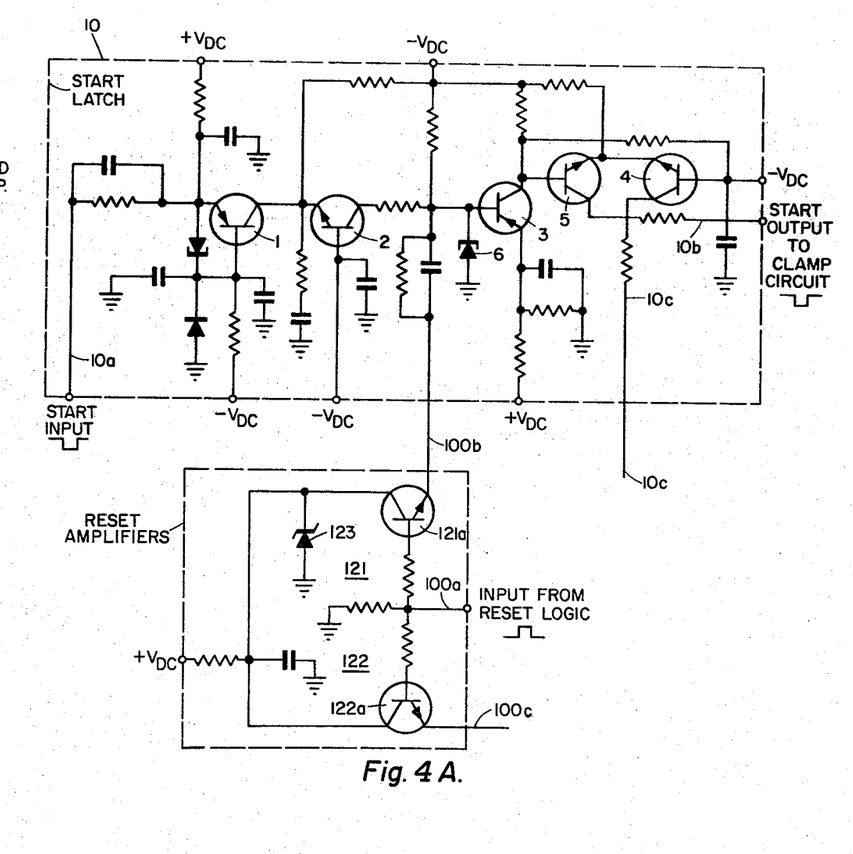
FIGS. 4a, 4b and 5–11 inclusive are electrical schematic illustrations of preferred embodiments of the various circuits employed in the system of FIG. 1.
Figure 4B:
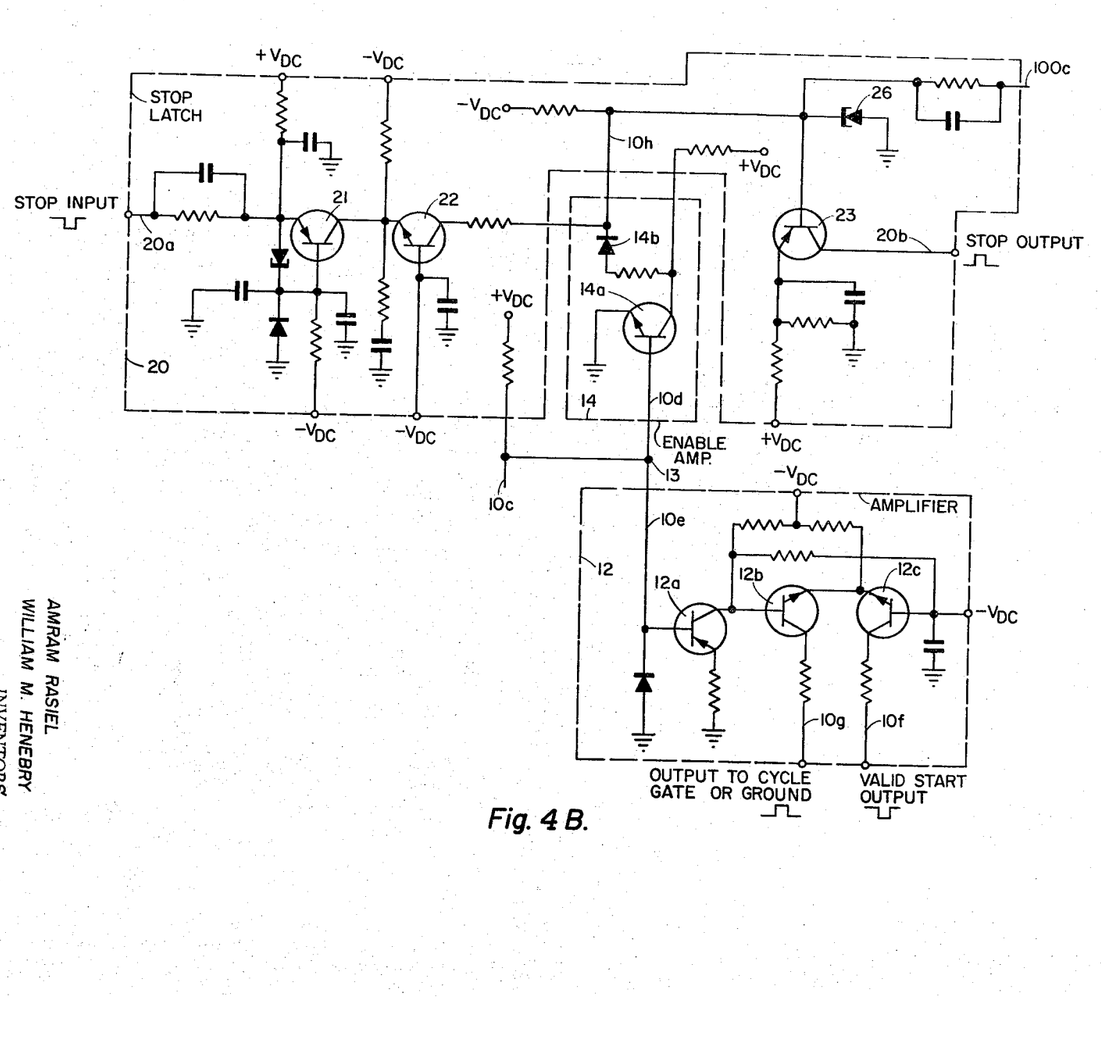

With particular reference to FIGS. 2A–2J and FIGS. 4–11, and in particular, first with reference to FIG. 4A, there is shown within dashed lines a preferred circuitry for start latch 10 of the system. If is pointed out that besides the preferred circuitry shown in FIG. 4A, this start latch 10 may also comprise either a tunnel diode or a set-reset bistable flip-flop, or any other circuitry of a bistable character, that is characterised in that it holds itself in one stable state until commanded to switch to its other stable state by a suitable command signal. Furthermore, it should be noted that stop latch 20, also enclosed within dashed lines in FIG. 4B, is somewhat identical to start latch 10 and that the considerations mentioned with respect to start latch 10 apply to stop latch 20. The heart of both start and stop latches 10 and 20 resides in tunnel diodes 6 and 26 respectively, both of which are normally "off," i.e., in the low voltage state.

The associated circuitry in both start and stop latches 10 and 20 is designed to switch these respective tunnel diodes 6 and 26 "on," i.e., to switch them to their high voltage states, when respective start and stop input signals are received at input terminals 10a and 20a.

A negative start input signal applied at terminal 10a will cause transistor 1, which is a PNP transistor and normally heavily conducting, to be driven to cut-off. As a result, transistor 2, an NPN transistor and normally slightly conducting, will now be driven heavily into conduction thereby switching latch tunnel diode 6 "on." With latch tunnel diode 6 thus switched to its high voltage state, transistor 3, a PNP transistor, amplifies and inverts the signal received at its base and transmits the amplified signal to the base electrode of transistor 5. Transistor 5 forms a current switching pair with transistor 4. Normally transistor 4 conducts while transistor 5 is cut-off. Consequently, the arrival of the amplified and inverted signal, which is now a positive going signal, from the collector of amplifying transistor 3 at the base electrode of transistor 5, will cause the states of conduction of this current switching pair to switch. As a result and since both transistors 4 and 5 are NPN transistors, a negative going output signal will appear on lead 10b from the collector electrode of transistor 5. This signal represents the start signal transmitted on lead 10b to clamp circuit 56 as illustrated in FIG. 2A. It should be noted that this start signal to clamp circuit 56 is a negative going signal from essentially zero voltage and occurs as a step function at time $t_1$, at which time the conversion operation by conversion circuit 50 commences, as hereinafter more fully described.

The second output signal of start latch 10 appears on lead 10c, shown connected to the collector electrode of transistor 4 of the current switching pair. It will be recalled that normally transistor 4 is conducting, but as a consequence of latch tunnel diode 6 being switched on as above described, transistors 4 and 5 switched their conduction states with transistor 4 becoming cut-off. As a result, a positive going output signal will appear on lead 10c, and as may be noted in FIGS. 1 and 4B, this positive going signal is transmitted simultaneously on leads 10e and 10d which are connected at junction point 13 to lead 10c.

Amplifier 12

Lead 10e transmits the positive going signal to amplifier 12. Amplifier 12 (see FIG. 4B) provides two outputs, one over lead 10f shown connected to the collector electrode of transistor 12c, and the second over lead 10g shown connected to the collector electrode of transistor 12b. The first output over lead 10f represents the valid start output of the system. The second output is transmitted over lead 10g to cycle gate 110, or, in the absence of such a cycle gate, lead 10g may be connected to ground. As may be noted in FIG. 4B, the positive going signal over leads 10c and 10e is applied to the base of PNP transistor 12a, which is normally conducting. As a consequence, transistor 12a is driven to cut-off and a negative going signal is transmitted from its collector electrode to the base electrode of transistor 12b. Transistors 12b and 12c are connected as a current switching pair and since they are both NPN transistors, the normally conducting transistor, 12b, will now be driven to cut-off and the normally off transistor, 12c, will be driven into conduction. The output on lead 10f will be a negative going signal and the output on lead 10g will be a positive going signal.

Conversion circuit 50

Figure 5:
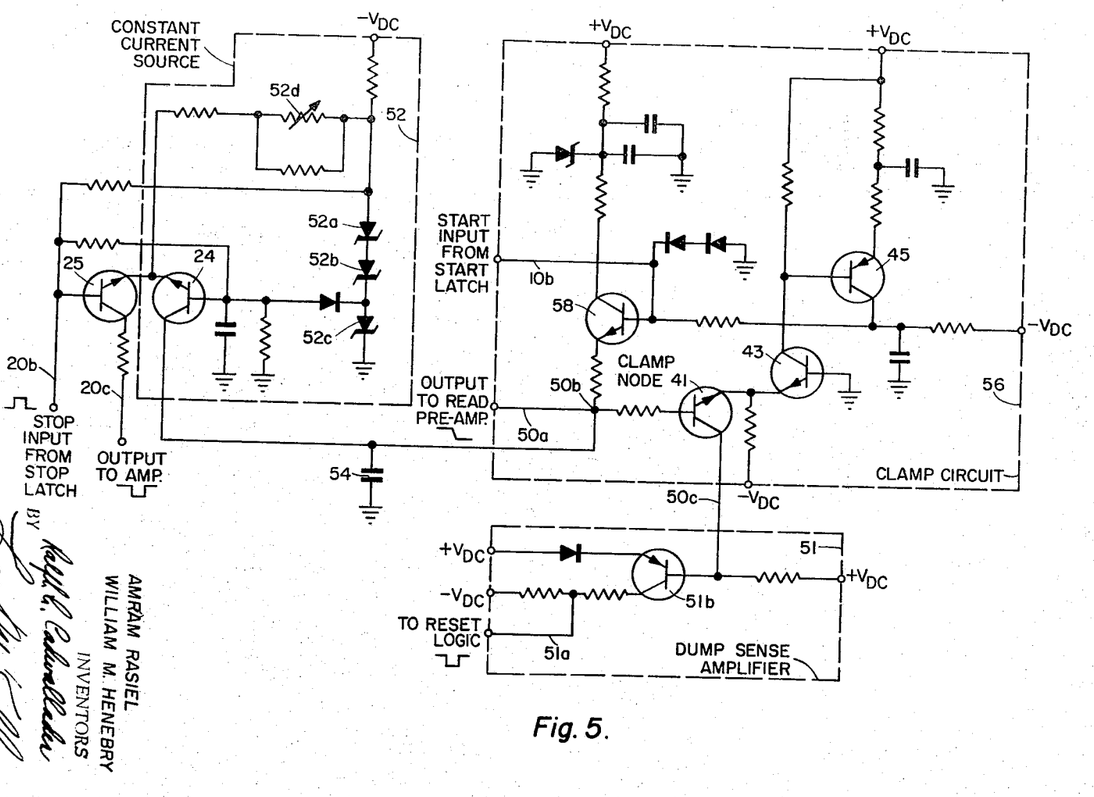
Figure 6:
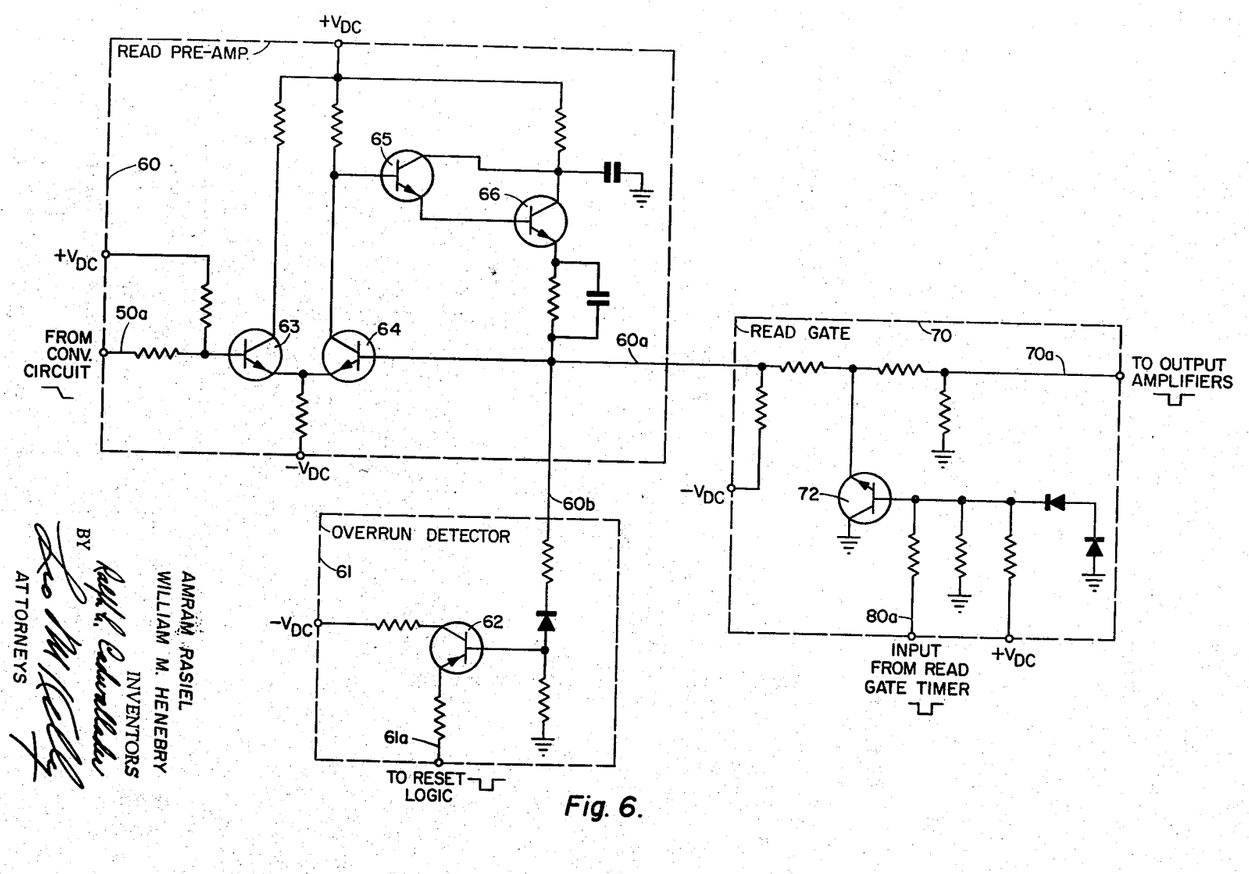

The circuitry shown in FIG. 5 functions, among others, to provide constant current for charging conversion capacitor 54. One plate of conversion capacitor 54 is connected to ground and the other plate is connected to clamp node 50b, to which is also connected clamp circuit 56. The function of clamp circuit 56 is to clamp to ground, or any other selected reference voltage, clamp node 50*b* and thereby conversion capacitor 54 until clamp circuit 56 is opened by the reception of a valid start input signal.

Constant current source 52 is a highly stable current source, independent of both voltage and temperature variations on the supply line. A string of series connected Zener diodes 52*a*, 52*b*, and 52*c* provide for temperature control, while variable resistor 52*d* is adjusted to supply the constant current desired.

Constant current source 52 is associated with a current switching pair, NPN transistors 24 and 25, which may be considered as forming the last stage of stop latch 20, as shown in FIG. 4B, and performs the identical function as the current switching pair, transistors 4 and 5, in start latch 10, as shown in FIG. 4A. Transistor 24 is normally conducting and since its collector electrode is directly connected to both clamp node 50*b* and conversion capacitor 54, it serves to supply a highly stable constant current to clamp node 50*b* from constant current source 52. At the same time, transistor 25 of the current switching pair is maintained in the non-conducting condition.

Clamp circuit 56 is an adapted version of the circuitry disclosed in a co-pending application by the same inventors entitled, "Electronic Clamp," S.N. 507,871, filed Nov. 15, 1965. As more fully described therein, it basically comprises a high performance operational amplifier with non-linear feedback in which is incorporated transistor switch 58. The operational amplifier comprises NPN transistors 41 and 43 connected as a differential pair, with the base electrode of transistor 41 connected to clamp node 50*b* and defining one input terminal of the operational amplifier and with the base electrode of transistor 43, which defines the other input terminal of the operational amplifier, being shown connected to ground. It should be noted, however, that if so desired, the base electrode of transistor 43 may also be connected to any desired reference voltage to which the clamp node 50*b* is intended to be referenced. The feedback loop of the operational amplifier may be traced from the collector electrode of transistor 43 through the collector-base junction of PNP transistor 45 and through the emitter-base junction of NPN switching transistor 58 to clamp node 50*b*.

Figure 2D:
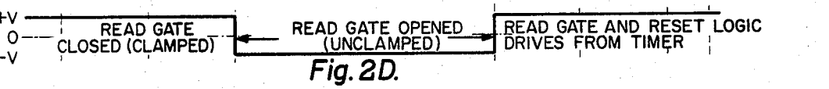
Figure 2E:
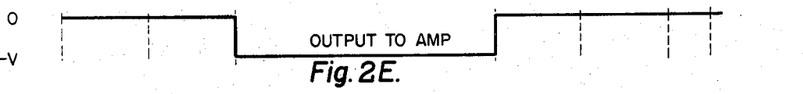
Figure 2F:
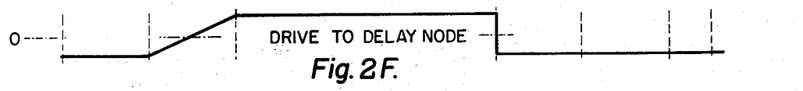
Figure 2G:
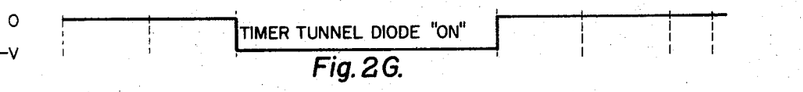
Figure 2H:
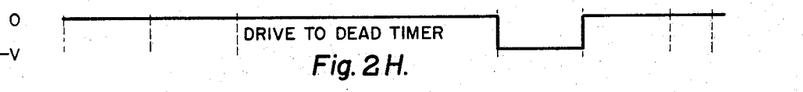
Figure 2I:
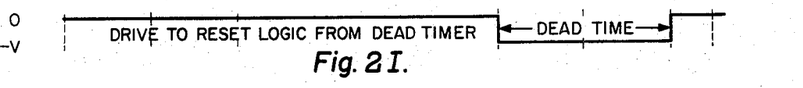
Figure 2J:
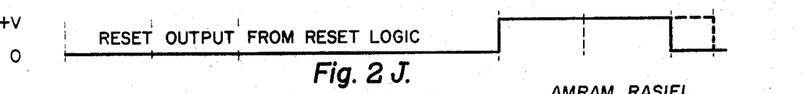
Figure 3:
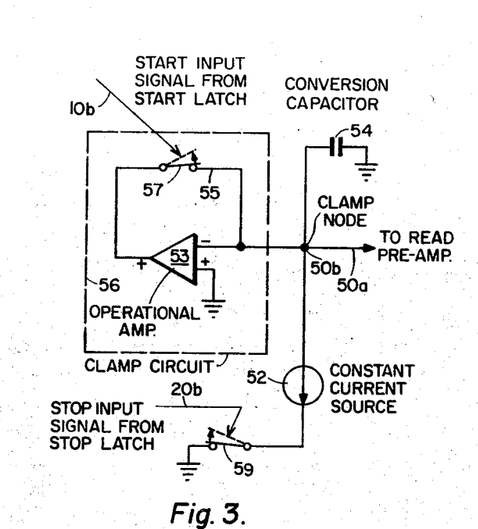
FIG. 3 is a block and circuit diagram of the conversion means around which the time-to-amplitude converter system of the invention is designed.

The negative going start signal, which commenced at time $t_1$, and which persists until reset occurring at time $t_4$, as may be noted with reference to FIGS. 2A and 2J, is applied from start latch 10 via lead 10*b* directly to the base electrode of switching transistor 58. Since switching transistor 58 is an NPN transistor and is normally conducting, the negative going start signal applied to its base will drive transistor switch 58 into the cut-off condition, and will maintain it in the cut-off condition until this signal disappears at time $t_4$, at which time the reset signal commences.

Once clamp circuit 56 and its component operational amplifier have thus been disabled, and with the clamp being open, i.e., transistor switch 58 being cut-off, precision timing conversion capacitor 54 becomes unclamped and starts charging linearly from constant current source 52 until the same is disconnected as hereinafter described.

Read preamplifier 60

The voltage on conversion capacitor 54 is constantly read out by read preamplifier 60 via lead 50*a*, which is also connected to clamp node 50*b*. The preferred circuitry of read preamplifier 60 is shown within dashed lines in FIG. 6. Essentially, read preamplifier 60, which is a high input-impedance, low output-impedance broadband preamplifier, comprises transistors 63 and 64 arranged as a differential pair, with a pair of emitter followers 65 and 66 connected in the feedback loop of transistor 64. As may be observed in FIG. 6, input lead 50*a* is connected to the base electrode of transistor 63, which presents a very high input-impedance to the signal being received from clamp node 50*b*. This signal equals the instantaneous voltage on conversion capacitor 54 as the same is being charged from constant current source 52. The high input-impedance presented by read preamplifier 60 allows for analog storage of the signal by conversion capacitor 54 for a time sufficient to allow for independent assessment of the initiating events. The output of read preamplifier 60 is taken from lead 60*a* which, because it is connected to both the base electrode of transistor 64, as well as to the pair of emitter followers 65 and 66 arranged in the feedback loop between the collector and base electrodes of transistor 64, presents a very low impedance and thus permits the availability at output amplifiers 71 and 73 of signals emanating from very low impedance voltage sources. The output of read preamplifier 60 is the negative going signal shown in FIG. 2C, as the same appears on output leads 60*a* and 60*b*.

Read gate 70

The output of read preamplifier 60 is applied to read gate 70, which is basically a zero-offset clamping gate controlled by a signal from read gate timer 80. The preferred circuitry of read gate 70 is shown within dashed lines in FIG. 6. As may be noted therefrom, it consists basically of NPN transistor 72 normally biased into heavy conduction with its collector electrode grounded. Read gate 70 in its normally closed, i.e., clamped condition with transistor 72 being fully conductive, effectively shunts to ground any signal that may be admitted to read gate 70 via lead 60*a*. With read gate 70 closed, no signal passes to output amplifiers 71 and 73 through lead 70*a*. Read gate timer 80 generates, pursuant to an internal timing sequence as hereinafter more fully described, a negative going signal which is applied via lead 80*a* directly to the base electrode of transistor 72. Since transistor 72 is an NPN transistor, the arrival at its base electrode of a negatively going signal of sufficient magnitude will cause the transistor to be driven to cut-off. As a result, read gate 70 becomes unclamped, i.e., read gate 70 opens to transmit any signal appearing on lead 60*a* to output amplifiers 71 and 73 via lead 70*a*. A signal representative of the read gate drive from read gate timer 80 is shown in FIG. 2D. As may be noted from FIG. 2D, the read gate drive is a positive voltage during the time that read gate 70 is closed and it changes by a step function at time $t_3$ to a negative going voltage and remains in that state during the time that read gate 70 is to be open, i.e., between time $t_3$ and $t_4$, at which time it again changes by a step function to its previous positive voltage level.

Overrun detector 61

In the absence of a timely stop input signal to stop the conversion process, as will be more fully described below, the output of read preamplifier 60 appearing on lead 60*a* is also constantly applied through lead 60*b* to overrun detector 61. A preferred circuitry of overrun detector 61 is shown within dashed lines in FIG. 6. It comprises PNP transistor 62, which is normally biased off. The negative going signal from read amplifier 60 is applied to the base electrode of transistor 62. As the level of this negative going signal becomes more negative, transistor 62 is progressively driven more and more into conduction. Consequently, an ever increasing negative going signal will appear at output lead 61*a* of overrun detector 61 and is transmitted thereby to reest logic 100. By proper selection of circuit parameters and bias voltages in overrun detector 61, the desired detection level may be set. At this level the signal from overrun detector 61 actuates reset logic 100 thereby driving both start and stop latches 10 and 20 to reset. In the preferred embodiment of the system, this detection level is normally set at 120 percent of full scale. In the event of such an overrun, read gate timer 80 will not be actuated, as more fully described below; read gate 70 will remain closed; and thus, no output signal will be presented to output amplifiers 71 and 73. Consequently, the multichannel pulse-height analyzer, to which the system of the invention is connected, will not be burdened with the task of classifying and recording useless information generated within the time-to-amplitude converter system of the invention. If the multichannel pulse-height analyzer is not presented with a signal to classify and record in the event of an overrun, it is not necessary to keep the converter system from processing the next time interval and, therefore, dead timer 90, in such an event, is not actuated.

STOP OPERATION

Enable amplifier 14

Figure 1:
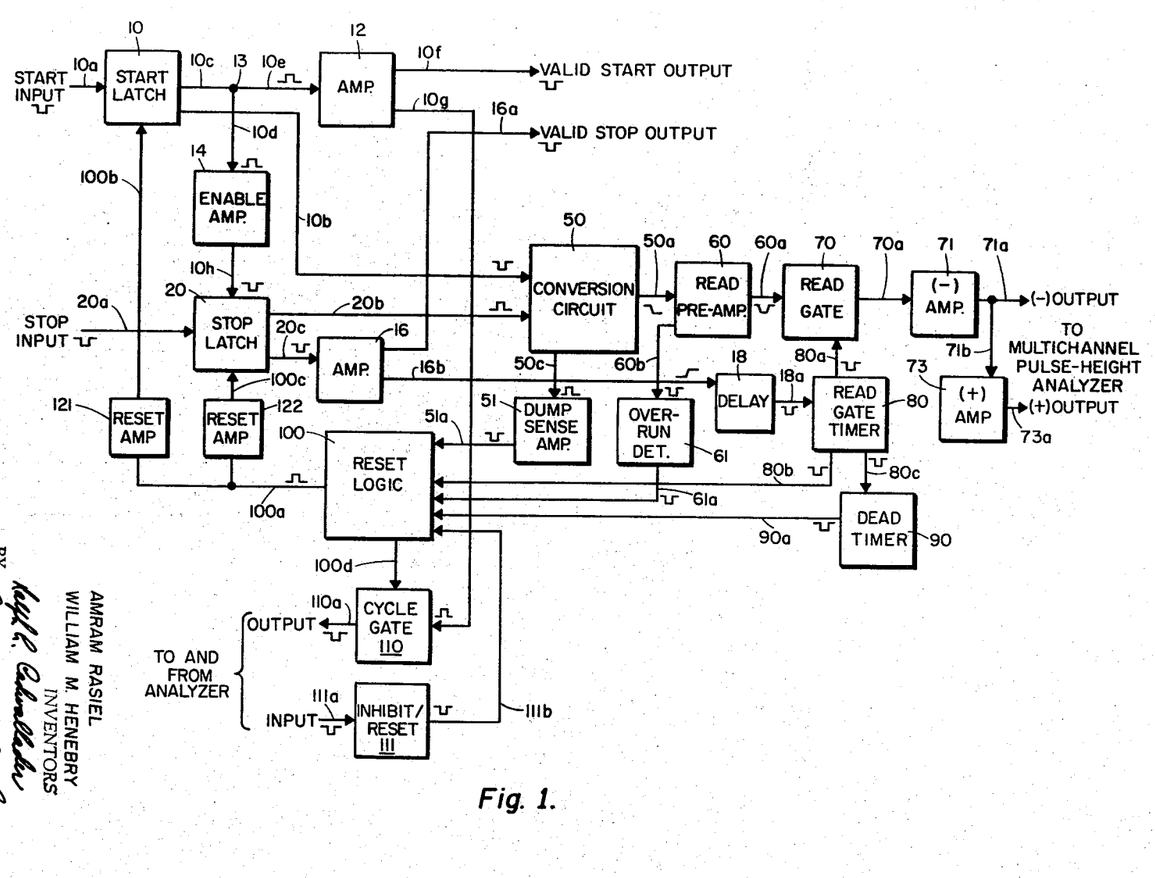
FIG. 1 is an electrical block diagram representation of a preferred embodiment of the time-to-amplitude converter system constructed in accordance with and embodying the present invention and illustrating the various circuits employed in a functional manner.

The positive signal reaching junction point 13 over lead 10c is also applied via lead 10d to enable amplifier 14 as illustrated in FIGS. 1 and 4B. The function of enable amplifier 14 is to unlock normally disabled stop latch 20 so that it may transmit a valid stop input signal to conversion circuit 50, as hereinbelow more fully described. Enable amplifier 14 is shown comprising NPN transistor 14a whose emitter is directly connected to ground and whose collector electrode is coupled through diode 14b via lead 10h to latch tunnel diode 26 of stop latch 20. The cathode of diode 14b is furthermore connected to the collector electrode of transistor 22 whose function in stop latch 20 is identical to the function of transistor 2 in start latch 10. Normally, NPN transistor 14a is non-conducting. Upon the arrival of the positive going signal at its base electrode via lead 10d, transistor 14a is driven into conduction, thereby reverse biasing diode 14b. As a result, a negative going input signal applied at input terminal 20a of stop latch 20 will now switch tunnel diode 26 "on," as more fully described below.

Stop latch 20

With reference to FIG. 4B there is shown within dashed lines preferred circuitry for stop latch 20 of the system. Besides the preferred circuitry shown, stop latch 20 may also comprise either a tunnel diode or a set-reset bistable flip-flop, or any other circuitry of a bistable character that is characterized by its ability to hold itsef in one stable state until commanded to switch to its other stable state by a suitable command signal. As stated above, the heart of stop latch 20 resides in tunnel diode 26 which is normally "off," i.e., in the low voltage state. The associated circuitry is designed to switch tunnel diode 26 "on," i.e., to switch to its high voltage state, when a stop input signal is received at input terminal 20a and when diode 14b is reverse biased through transistor 14a in enable amplifier 14 by a valid start signal received from start latch 10.

A negative stop input signal applied at terminal 20a will cause transistor 21, which is a PNP transistor and normally heavily conducting, to be driven to cut off. As a result, transistor 22, an NPN transistor and normally slightly conducting, will now be driven heavily into conduction, thereby switching latch tunnel diode 26 "on" when diode 14b is reverse biased. With latch tunnel diode 26 thus switched to its high voltage state, transistor 23, a PNP transistor, amplifies and inverts the signal received at its base and transmits the amplified signal via lead 20b to the base of transistor 25, illustrated in FIG. 5. Transistor 25 represents one part of a current switching pair comprising transistors 24 and 25. As already mentioned, transistor 24 normally conducts, furnishing a conductive path for constant current from constant current source 52 to conversion capacitor 54. Thus, normally, transistor 25 is maintained in the non-conducting condition. Since transistor 25 is an NPN transistor, the application of a positive going signal at its base electrode will render transistor 25 conductive and simultaneously render transistor 24 non-conductive. As a result of the switching of the states of conduction of the current switching pair, transistors 24 and 25, constant current source 52 is effectively prevented from further charging conversion capacitor 54.

This positive going signal to shut off constant current source 52 is shown in FIG. 2B and, as may be noted therefrom, it changes by a step function at time $t_2$ to a positive voltage and remains at that level until time $t_4$. Since time $t_1$ represents the beginning of the conversion time interval and since time $t_2$ represents the end of the conversion time interval, the time interval being measured by the system is that from time $t_1$ to time $t_2$. During this time interval precision timing conversion capacitor 54 is continuously and linearly charged to a voltage the amplitude level of which is directly proportional to this time interval.

INTERNAL TIMING SEQUENCE

Amplifier 16

The internal timing sequence previously mentioned is also initiated at time $t_2$ with the switching of current switching pair, transistors 24 and 25, responsive to the stop signal shown in FIG. 2B. Thus, the internal timing sequence commences with the conduction of normally off transistor 25, as a result of which, a negative going signal will be transitted via lead 20c to amplifier 16. The preferred circuitry of amplifier 16 is shown within dashed lines in FIG. 7. The function of amplifier 16 is two-fold. First, it presents a valid stop output signal on lead 16a and, second, it transmits via lead 16b a positive going ramp voltage as a drive to delay node 16c of delay circuitry 18. This positive going ramp voltage is shown in FIG. 2F.

Figure 7:
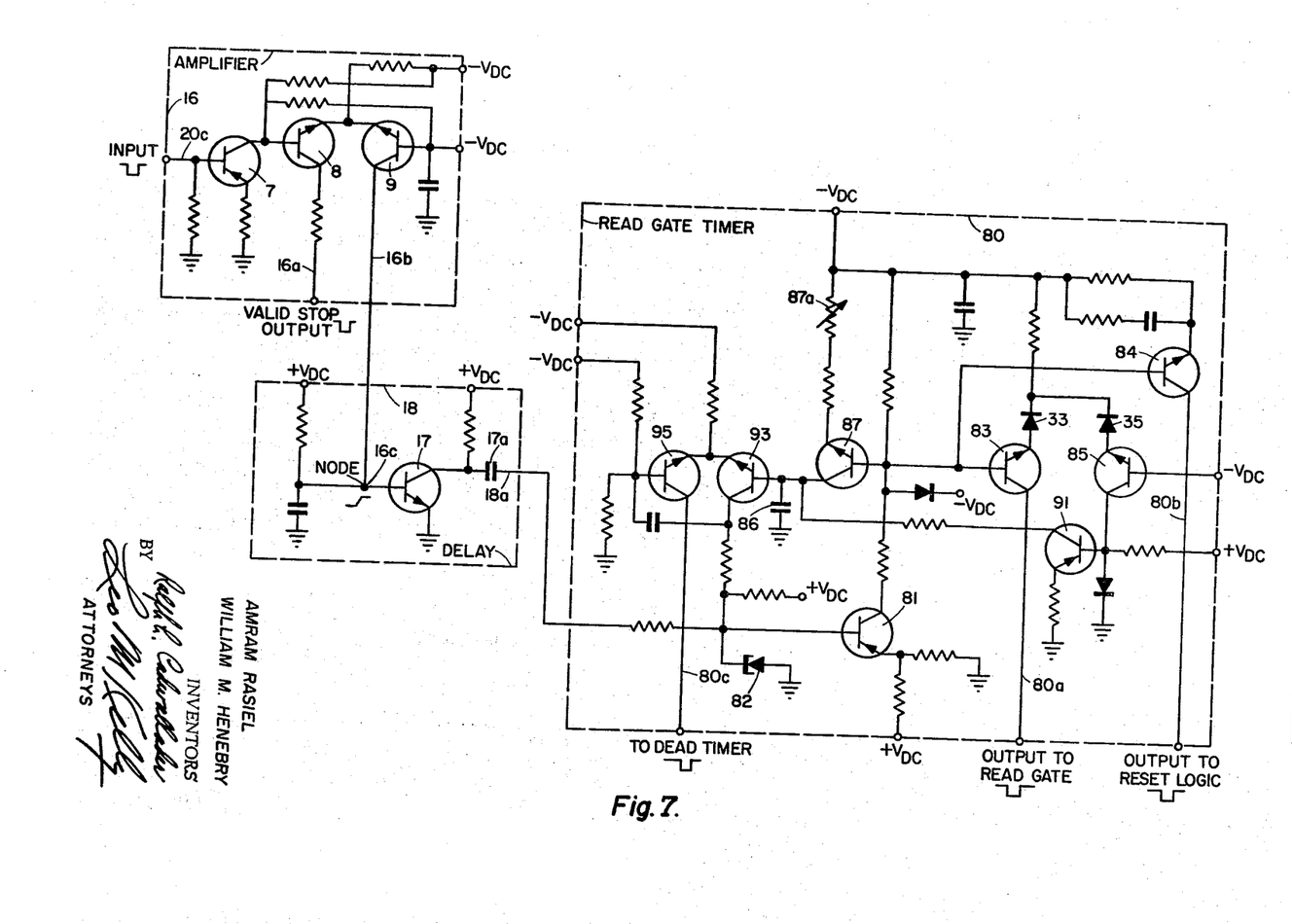

Amplifier 16 essentially comprises PNP transistor amplifier 7 operatively connected to a current switching pair comprising transistors 8 and 9. Normally, transistor 9 is conducting while transistor 8 is in the cut-off condition. The arrival of a negative going signal via lead 20c from the collector electrode of transistor 25 at the base electrode of PNP transistor 7 will cause transistor 7 to transmit a positive signal to the base of normally non-conducting transistor 8. As a result, the states of conduction of this current switching pair, transistors 8 and 9, will switch and a negative going valid stop output will appear at the collector of transistor 8 and thus on lead 16a of amplifier 16. Simultaneously, a positive going ramp voltage will be transmitted from the collector electrode of transistor 9 via lead 16b to delay node 16c of delay 18.

Delay 18

Since delay node 16c is directly connected to the base electrode of transistor 17, which is normally biased off, the arrival of the positive going ramp voltage at the base thereof, upon reaching a sufficient threshold level, as at time $t_3$, will render transistor 17, an NPN transistor, conductive. A small coupling capacitor 17a, having one plate connected to the collector electrode of transistor 17 and the other plate connected by lead 18a to read gate timer 80, will transmit thereto a negative going signal.

Read gate timer 80

The preferred circuitry of read gate timer 80 is illustrated within dashed lines of FIG. 7. It comprises tunnel diode 82, normally biased off, and connected to lead 18a and PNP transistor 81, also normally biased off, and likewise connected via its base electrode to lead 18a. The collector electrode of transistor 81 is directly coupled to the bases of NPN transistors 83, 84 and 87, all normally non-conducting. Transistors 83 and 85 form a current switching pair. The emitter electrodes of transistors 83 and 85 are connected to one another and to a negative source of direct current potential via diodes 33 and 35. The base electrode of PNP transistor 91 is shown connected directly to the collector electrode of transistor 85 and its collector electrode is directly coupled to the collector electrode of transistor 87. Transistors 91 and 85 are normally conducting. The emitter electrode of transistor 87 is connected by means of variable resistor 87a to a negative source of biasing potential.

A second current switching pair, NPN transistors 93 and 95, is also shown connected, with the base electrode of transistor 93 directly connected to the collector electrode of transistor 87. At the junction of the connection of the base electrode of transistor 93 with the collector electrode of transistor 87, is also shown connected one plate of timing capacitor 86, whose other plate is grounded. The function of timing capacitor 86 will be more fully described below. Normally transistor 93 is conducting and transistor 95 is non-conducting.

The functions of read gate timer 80, as already mentioned above, are to render read gate 70 unclamped, to provide a drive to reset logic 100 to prevent reset during readout, and, at the end of the read gate time interval, to provide a drive to dead timer 90. As may be noted in FIG. 7, the output from read gate timer 80 to read gate 70 is transmitted via lead 80a, which is connected to the collector electrode of transistor 83, normally non-conducting. The output drive to reset logic 100 from read gate timer 80 is transmitted via lead 80b shown connected to the collector electrode of transistor 84, also normally non-conducting. These two output signals, which function as drives to read gate 70 and to reset logic 100 respectively, are identical to one another and are depicted as one signal in FIG. 2D. As may be noted in FIG. 2D, the signal commences at time $t_3$ and lasts to time $t_4$, coinciding in time with the time interval that timer tunnel diode 82 is on, as shown in FIG. 2G.

The output signal, or drive, from read gate timer 80 to dead timer 90 is transmitted thereto via lead 80c, which is shown connected to the collector electrode of transistor 95, normally maintained in its non-conducting condition.

Upon the application of a negative going signal via lead 18a to tunnel diode 82, which occurs at time $t_3$, tunnel diode 82 is turned on, i.e., it is switched to its high voltage state. Simultaneously therewith, normally nonconducting PNP transistor 81 is also driven into conduction, and a positive signal is transmitted from its collector electrode to the base electrodes of non-conducting transistors 83 and 84, effectively rendering these NPN transistors conductive. As a consequence, a negative going signal will be transmitted at time $t_3$ via both lead 80a to read gate 70, causing the same to be opened, and via lead 80b to reset logic 100. Tunnel diode 82 will remain in its conducting high voltage state from time $t_3$ to time $t_4$, during which the negative going signal is being transmitted thereto via lead 18a, which signal is shown in FIG. 2G. It may be noted that this coincides with the drive to delay node 16C shown in FIG. 2F, which reached its threshold level at time $t_3$ and switched by a step function to its negative voltage level at time $t_4$. The delay time is from time $t_2$ to time $t_3$ during which the drive to delay node 16c increases as a ramp voltage. It may also be noted that the time duration during which timer tunnel diode 82 is in its high voltage state, i.e., from $t_3$ to $t_4$, as shown in FIG. 2G, also determines the time duration of the read gate and reset logic drives, as shown in FIG. 2D. Thus read gate 70 is unclamped for as long as timer tunnel diode 82 is on.

The signal drive to dead timer 90 is initiated at the end of the read gate time interval; i.e., at time $t_4$, with the signal being shown in FIG. 2H. This occurs since the positive signal from the collector electrode of transistor 81 has also been directly transmitted to the base electrode of transistor 87, driving the same into conduction. At the same time, the states of conduction of the current switching pair, transistors 83 and 85, changed, with the heretofore conducting transistor 85 being cut-off. As a consequence, transistor 91 also ceased conducting. Thus, the conduction of transistor 87 will commence charging timing capacitor 86. At time $t_4$, the charge accumulated on timing capacitor 86 reaches a level sufficient to cause a switch in the states of conduction of transistors 93 and 95 by switching transistor 93 "off" and transistor 95 "on." When transistor 93 is driven to cut-off positive current resets tunnel diode 82 to its low voltage state, transistors 81 and 83 are turned off, and transistors 85 and 91 are turned on. Timing capacitor 86 then discharges through transistor 91. Transistor 95 is maintained in its conducting condition through time $t_5$, at which time the charge on timing capacitor 86 has dropped to a level insufficient to maintain transistor 93 in the cut-off condition and the same will once again revert to its normal conductive state, with transistor 95 becoming cut-off.

The detailed circuitry of dead timer 90 has been omitted since it is exactly identical to the preferred circuitry shown in and described with reference to read gate timer 80 in FIG. 7. The negative going signal drive to dead timer 90, as shown in FIG. 2H and transmitted to dead timer 90 via lead 80c, will cause a tunnel diode to be switched on in the same manner as tunnel diode 82 has been switched on. Consequently a transistor, similar to transistor 81, will render normally non-conducting transistors, similar to transistors 83, 84 and 87, conductive. The one difference between dead timer 90 and read gate timer 80 is that dead timer 90 has only one output lead 90a. Output lead 90a transmits a dead time signal drive to reset logic 100, with the signal being shown in FIG. 2I. Such a dead time interval persists from time $t_4$ through time $t_6$. The reason for providing the dead time interval which, as may be noted with reference to FIG. 2D, follows the readout interval, is to allow the pulse-height analyzer, with which the system of the invention may be used, time to become insensitive to further information and thus minimize or prevent pile-up effects at the input of said pulse-height analyzer.

By way of reference to the circuitry of read gate timer 80, as illustrated in FIG. 7, the single output of dead timer 90 via lead 90a is derived from the collector electrode of a transistor similar to transistor 84 of read gate timer 80. The leads of dead timer 90 that correspond to the other two output terminals of read gate timer 80, i.e., leads 80a and 80c, are conveniently connected to ground in the circuitry of dead timer 90.

*Output amplifies 71 and 73*

Since read gate timer 80 opened read gate 70 at time $t_3$ and maintained it in its unclamped state through time $t_4$, the output of conversion circuit 50 is permitted to be transmitted via the read preamplifier 60 and lead 70a to output amplifiers 71 and 73. The output signal to amplifiers 71 and 73 is shown in FIG. 2E.

Figure 9:
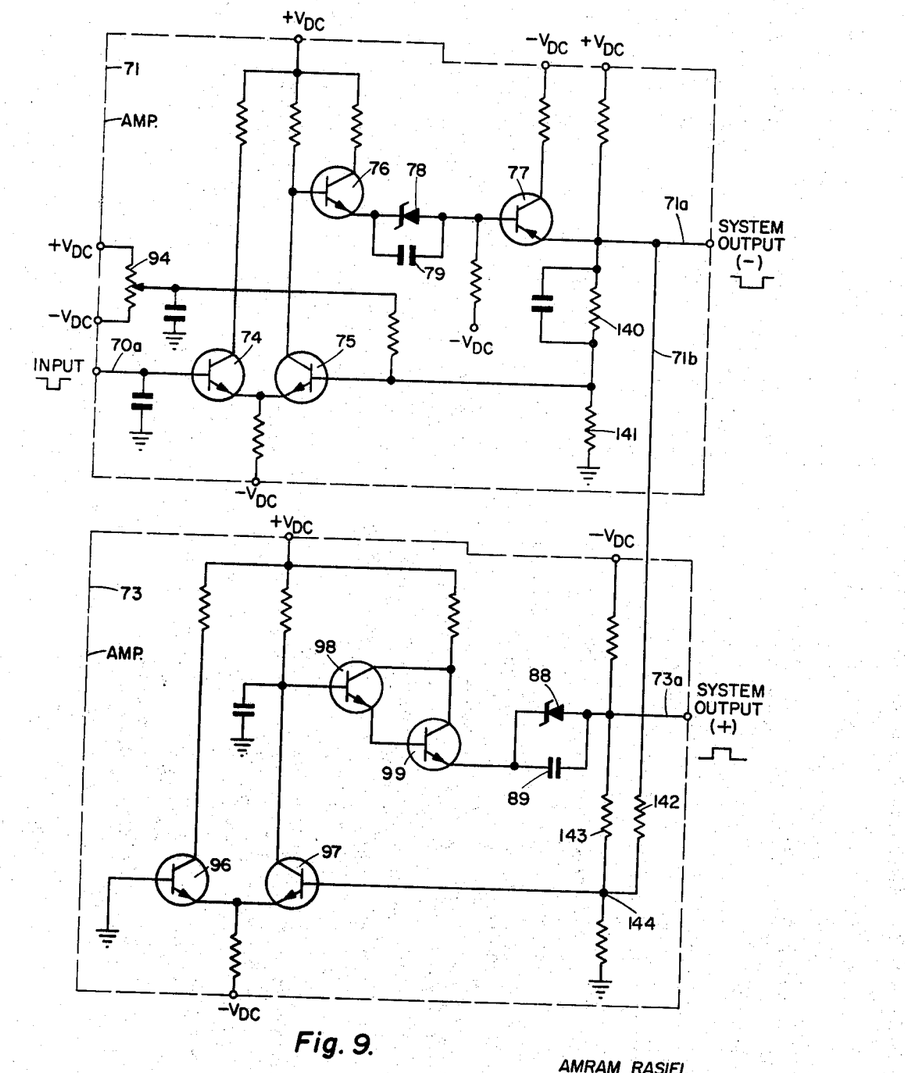

The function of output amplifiers 71 and 73 is to make both negative and positive signals available at output terminals 71a and 73a of the time-to- amplitude converter system from very low impedance voltage sources to the multichannel pulse-height anaylzer with which the system may be used. Thus, essentially, output amplifiers 71 and 73 are high input-impedance and very low output-impedance amplifiers and are similar in circuit construction to read preamplifier 60. A detailed circuitry of preferred embodiments of output amplifiers 71 and 73 is shown in FIG. 9. The negative going signal, as shown in FIG. 2E, is applied via lead 70a to the base of transistor 74. Transistors 74 and 75 form a differential pair. The negative going signal applied to the base of transistor 74 via lead 70a will effect a change in the conduction of this differential pair and, as a result, a negative signal will be transmitted to the base of transistor 76. Transistor 76, an NPN transistor, and transistor 77, a PNP transistor, are arranged as a pair of emitter followers in the feedback loop of the collector-base circuit of transistor 75. The base of transistor 77 is coupled via a parallel combination of Zener diode 78 and capacitor 79 to the emitter electrode of transistor 76. Normally transistors 76 and 77 are conducting. When the differential pair, transistors 74 and 75, change their conduction and a negative signal arrives at the base of NPN transistor 76, which is normally conducting, the same is made less conducting and simultaneously therewith transistor 77 is made more conducting, thus causing the voltage at the base electrode of transistor 75 to become more negative, thereby balancing the voltage input at the base electrode of transistor 74. Since the base current of transistor 75 is substantially zero due to the high input impedance the voltage on lead 71a is determined by resistors 140 and 141. As a result, a negative going output signal will be available from a very low impedance voltage source (due to the emitter follower feedback configuration) at output terminal 71a of the time-to-amplitude converter system.

To make a complementary positive signal also available at the second output terminal 73a of the time-to-amplitude converter system, the negative output signal appearing at terminal 71a is also transmitted via lead 71b to the base electrode of NPN transistor 97, which is normally on. Transistors 96 and 97 form a differential pair. Transistors 98 and 99, are connected as a pair of emitter followers in the collector-base circuit of transistor 97. The second output terminal, 73a, of the system is shown connected by means of the parallel combination of Zener diode 88 and capacitor 89 directly to the emitter electrode of transistor 99. When the conduction of transistors 96 and 97 changes, a positive going signal will appear at this second output terminal, 73a. Essentially the current via lead 71b through resistor 142 is balanced by the current from output 73a through resistor 143, thus maintaining node 144 at ground potential, the potential of the base electrode of transistor 96. Thus a positive going output signal will be available from a very low impedance voltage source (due to the emitter follower feedback configuration) to the multichannel pulse-height analyzer with which the system may be used.

RESET OPERATION

Reset logic 100

The function of reset logic 100 is to drive start and stop latches 10 and 20 to reset through reset amplifiers 121 and 122, respectively, at the appropriate time as determined by one or more signals received by reset logic 100 from read gate timer 80, dead timer 90, overrun detector 61, dump sense amplifier 51, and inhibit/reset 110. Reset logic 100, as shown in FIG. 1, basically comprises the reset logic circuitry illustrated in detail in FIG. 8 and reset amplifiers 121 and 122 comprise transistors 121a and 122a connected as emitter followers as shown within dashed lines 120 in FIG. 4A.

Figure 8:
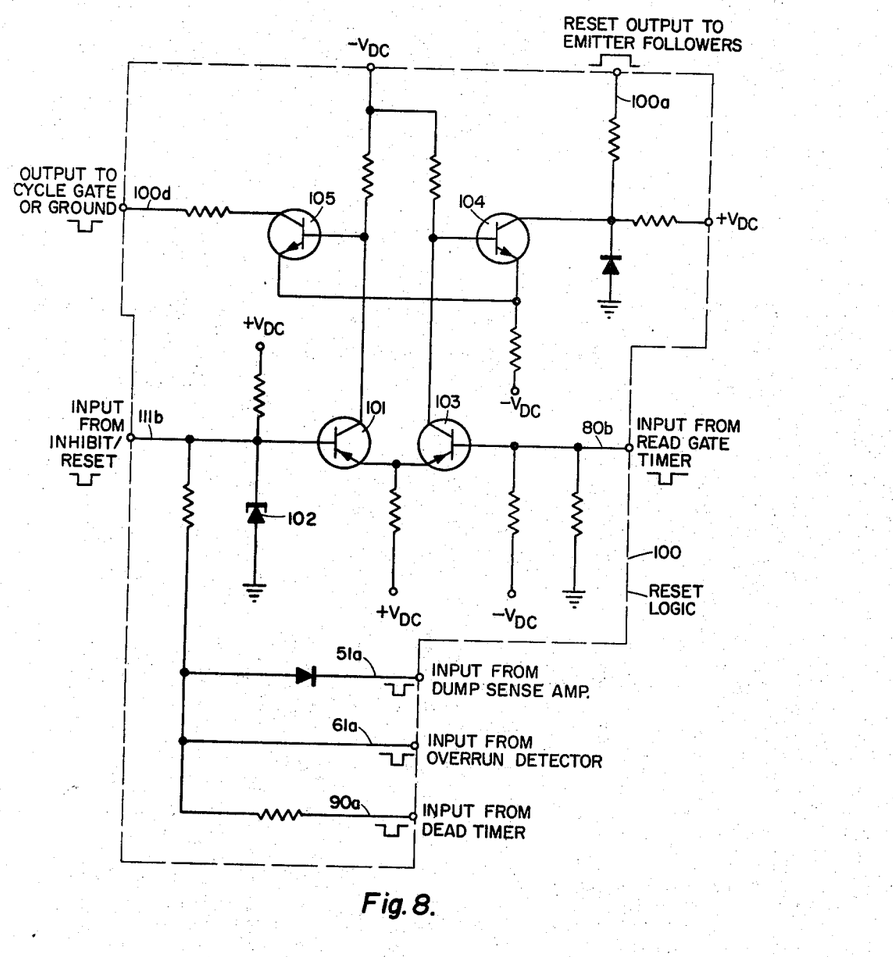

The reset logic circuitry shown in FIG. 8 essentially comprises tunnel diode switch 102, current switching pair of PNP transistors 101 and 103, and output NPN transistors 104 and 105 whose bases are respectively connected to the collector electrodes of transistors 103 and 101. Normally, with tunnel diode switch 102 switch "off" (i.e., in the low-voltage state), transistors 101 and 105 are also in the non-conducting condition, while transistors 103 and 104 are conducting. The reset logic drive signal from read gate timer 80, as shown in FIG. 2D, is applied between the time interval $t_3$ through $t_4$, the time during which read gate 70 is in its unclamped condition, directly to the base electrode of PNP transistor 103 and causes the same to be driven further into conduction. As a result, transistor 104 is also driven into heavier conduction and, consequently, no positive going reset output from reset logic 100 can be transmitted to reset emitter followers 121 and 122 via lead 100a during this readout time interval.

It will be recalled that, if a valid stop input signal is not received, an overflow condition ensues and read gate timer 80 does not generate a negative going signal on lead 80b to reset logic 100. However, overrun detector 61 senses the overflow condition and generates a negative going signal on lead 61a. When this signal reaches the predetermined threshold level, it will cause tunnel diode switch 102 to switch to its high voltage state. As a result, the states of conduction of the current switching pair, transistors 101 and 103, will switch and a negative going signal will be transmitted to the base electrode of transistor 104. This negative signal will drive NPN transistor 104 to cut off and, as a consequence, a positive reset signal will be transmitted from its collector electrode via lead 100a to reset amplifiers 121 and 122, shown in FIG. 4A. Reset amplifiers 121 and 122 are emitter followers which will, in turn, switch latch tunnel diodes 6 and 26 in start and stop latches 10 and 20, respectively, to a reset condition; i.e., to a voltage below their normally "off" voltages. Simultaneously with the ceasing of conduction of transistor 104, the normally off transistor, 105, is biased into conduction. As a result, a negative going pulse will appear at the collector electrode of transistor 105 and lead 100d connected thereto, which may serve as the output to cycle gate 110, or, in the absence thereof, may be connected to ground.

Following a proper readout time interval, which ends at time $t_4$, read gate timer 80 actuates dead timer 90 which, responsive thereto, provides a negative going dead time signal to reset logic 100, via lead 90a. This dead time signal is illustrated in FIG. 2I and is shown to persist from time $t_4$ throught time $t_6$. This dead time signal will switch tunnel diode switch 102 "on" and will maintain the same on its high voltage condition for the duration of the dead time. As will be recalled, the function of dead timer 90 is to prevent the possibility of pile-up of the multichannel pulse-height analyzer input by assuring that the time-to-amplitude converter system cannot undergo a conversion cycle until the analyzer has had an opportunity to absorb the previously presented signal.

When tunnel diode switch 102 is switched "on" by the signal from overrun detector 61, or the signal from dead timer 90, start and stop latches 10 and 20 are driven to reset and their respective start and stop signals terminate. Transistor switches 24 and 48 (see FIG. 5) immediately commence conducting and any residual charge on conversion capacitor 54 discharges through clamp node 50b.

Dump sense amplifier 51 assures that conversion circuit 50 is started from the same quiescent or initial condition, i.e., that conversion capacitor 54 has been fully discharged to a predetermined voltage level which may be either ground or a reference voltage. A preferred circuitry for dump sense amplifier 51 is shown within dashed lines in FIG. 5. Essentially, dump sense amplifier 51 comprises normally conducting PNP transistor 51b and biasing circuitry to keep this transistor normally conducting. The input to dump sense amplifier 51 is via lead 50c shown connecting the collector electrode of transistor 41 directly to the base electrode of transistor 51b. The output of dump sense amplifier 51 is derived via lead 51a shown connected to the collector electrode of transistor 51b. Normally with transistor 51b conducting, no signal will appear at output lead 51a of dump sense amplifier 51. Following a conversion-readout process, and if at that time a residual charge is present on conversion capacitor 54 clamp circuit 56 is unbalanced, and a positive signal will be applied via lead 50c to the base electrode of transistor 51b. Since transistor 51b is a PNP transistor, this positive signal at its base will reduce or may even cut off its conduction. As a consequence, a negative going dump hold-off signal will appear at output lead 51a and be transmitted thereby to reset logic 100, as described with reference to the operation of this logic shown in FIG. 8, with the consequent result that start and stop latches 10 and 20 will not be released while this dump hold-off signal on lead 51a persists.

Thus, dump sense amplifier 51 generates a negative going signal on lead 51a whenever an imbalance exists in conversion circuit 50. It must be pointed out that this negative going signal of dump sense amplifier 51 is insufficient by itself to switch tunnel diode switch 102 "on"; but it is sufficient to maintain tunnel diode switch 102 in its "on," high voltage condition once it has been switched "on" by a signal from overrun detector 61, dead timer 90, or inhibit/reset 111. It will maintain tunnel diode switch 102 in its "on" condition until this dump hold-off signal on lead 51a terminates, indicating thereby that conversion capacitor 54 has returned to its initial quiescent condition.

A negative going input signal applied to reset logic 100 over lead 111b from inhibit/reset 111 will likewise switch tunnel diode switch 102 "on," thus driving start and stop latches 10 and 20 to reset at any time except during readout interval, $t_3$ through $t_4$, i.e., during the presence of the reset logic drive signal (see FIG. 2D) from read gate timer 80 on lead 80b at the base electrode of transistor 103, as previously explained. The most obvious application of an inhibit/reset input signal via lead 111b is to use the dead time signal from the multichannel pulse-height analyzer to control the operation of the time-to-amplitude converter system. The application of the dead time signal from the analyzer to the converter system will insure that the converter system will not start on another conversion sequence until the analyzer has had time completely to process the previous converter system output with which it has been presented.

Cycle gate 110, on the other hand, may be used to slave the multichannel pulse-height analyzer or other experimental equipment with which the converter system of the invention may be used to the operation of the time-to-amplitude converter system. Cycle gate 110 is actuated by a valid start input at time $t_1$ by a signal applied thereto via lead 10g and continues actuated throughout the conversion cycle until the time-to-amplitude converter system is released from reset at the end of the conversion-readout process. This may occur at time $t_6$, which represents the end of the dead time; or at time $t_7$, which represents the end of a signal from dump sense amplifier 51, which signal indicates that conversion capacitor 54 still has not been fully discharged.

The positive going reset output to reset amplifiers 121 and 122, which signal is shown in FIG. 2J, is applied via lead 100a simultaneously to the base electrodes of a pair of emitter followers comprising NPN transistors 121a and 122a, as illustrated in FIG. 4A. The base electrode of transistors 121a and 122a are shown coupled to lead 100a, while their collector electrodes are directly connected to one another, to a positive source of biasing potential, and to the cathode of Zener diode 123, whose anode is grounded. Normally, both transistors 121a and 122a are biased off. The arrival of this positive reset output signal at time $t_4$ will drive both transistors 121a and 122a into conduction. Since the emitter electrode of transistor 121a is connected via lead 100b to latch tunnel diode 6, and, since the emitter electrode of transistor 122a is connected via lead 100c to latch tunnel diode 26, tunnel diodes 6 and 26 will be switched to a voltage lower than their normally "off" voltages by the application thereto of positive signals via respective leads 100b and 100c at the time that transistors 121a and 122a are driven into conduction. Furthermore, as long as the reset output signal from reset logic 100, shown in FIG. 2J, persists, both latch tunnel diodes 6 and 26 will be effectively maintained in their said lower than normal "off" voltage conditions, inhibiting thereby the commencement of any further conversion cycle during this time interval. As may be noted in FIG. 2J, this reset drive persists throughout the dead time interval, i.e., to time $t_6$, or it may even persist for a further increment of time, until time $t_7$ (note the signal indicated by dashed lines in FIG. 2J) in the event that the dump sense amplifier signal still persists after the expiration of the dead time to indicate that an imbalance still exists in conversion circuit 50. Upon termination of the reset output signal from reset logic 100, transistors 121a and 122a again become non-conducting and tunnel diodes 6 and 26 are released to their normally "off" voltage conditions. Thus, start latch 10 and stop latch 20 are released from reset and are ready to receive start and stop input signals.

Cycle gate 110

Figure 10:
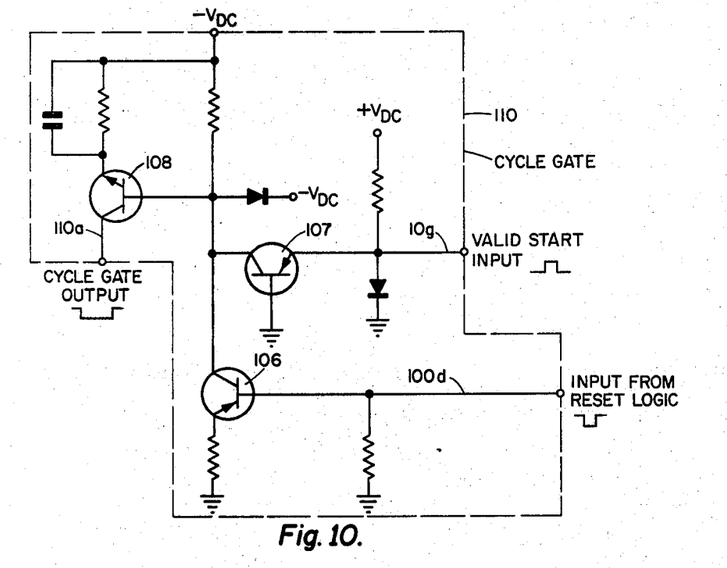

A preferred circuitry for cycle gate 110 is illustrated in FIG. 10. As may be noted therein, it consists essentially of PNP transistors 106 and 107 and NPN transistor 108 and circuitry for the application of the requisite bias voltages. Normally, all the transistors are off. The arrival at time $t_1$ of a valid start positive input signal via lead 10g from amplifier 12 will turn transistor 107 on. Since the collector electrode of transistor 107 is directly connected to the base electrode of transistor 108, a positive going signal will be transmitted to the base electrode of transistor 108. As a consequence, transistor 108 will be driven into conduction and a negative going signal will appear at the cycle gate output terminal 110a. Since the valid start signal persists only through time $t_4$ and, as a consequence, the cycle gate output would return to zero at time $t_4$, a further input signal, this time from reset logic 100, is applied via lead 100d (see FIG. 8) to the base of transistor 106, driving it into conduction. As a result, a further positive signal will be transmitted from the collector electrode of transistor 106 to the base of transistor 108, maintaining it in conduction. This signal from reset logic 100 persists through time $t_6$ or $t_7$, as already explained, signalling the end of the conversion-readout process as well as the end of any imbalance which may have persisted on conversion capacitor 54. As a result, the cycle gate output appearing at terminal 110a, that began at time $t_1$, will persist through time $t_6$ or $t_7$, until the time-to-amplitude converter system is released from reset.

Inhibit/reset 111

Figure 11:
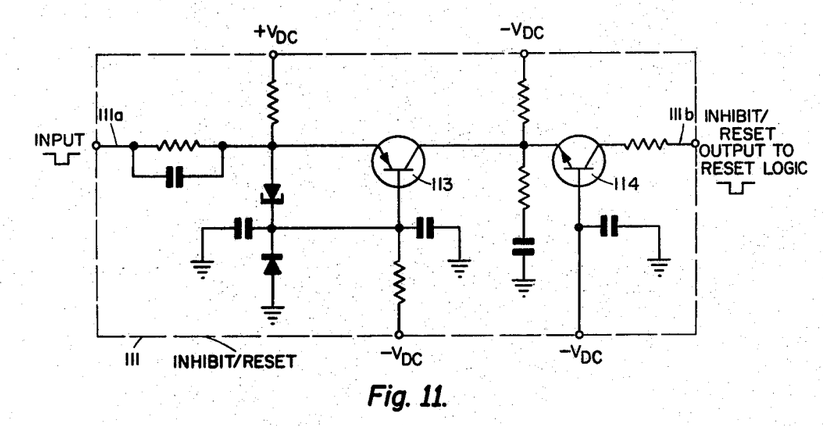

A preferred circuitry for inhib/reset 111 is shown in FIG. 11. This circuitry is essentially the same as the first portion of the circuitry of start latch 10, shown in FIG. 4A. It comprises PNP transistor 113, NPN transistor 114, input terminal 111a, output terminal 111b, and biasing voltages and circuitry to maintain PNP transistor 113 in a heavy conductive state and NPN transistor 114 in a non-conducting state. It should be noted that transistors 113 and 114 perform functions identical to those performed respectively by transistors 1 and 2 in start latch 10. Thus, the application of a negative signal at input terminal 111a will cause transistor 113 to be driven toward cut-off and simultaneously will cause transistor 114 to be driven into conduction. As a result, a negative going signal will appear at output lead 111b, and will be applied thereby to reset logic 100 to cause the same to be actuated from this external circuitry, as already explained above.

Conclusion

Precise measurement of data obtained with the time-to-amplitude converter system of the invention indicates a resolution of approximately 50 picoseconds at half amplitude as measured on a 100 nanosecond scale. This resolution changed proportionally for higher ranges and was found to be independent of the rate of conversion. Linearity was determined by using random, non-coherent timing pulses and comparing the resulting spectrum with the theoretically predicted result. On a full scale of $10^4$ pulses per channel, a differential non-linearity of less than 0.2% was calculated.

The present invention thus provides a time-to-amplitude converter system of the electronic variety adapted for converting time intervals associated with randomly occurring, short-lived events, such as nuclear events, to voltages while providing good differential and integral linearity, stability, and high resolution over a wide range of operating condtions.

Since certain changes may be made in the above described time-to-amplitude converter system without departing from the scope of the invention herein disclosed, it is intended that all matter contained in the above disclosure or shown in the accompanying drawings shall be interpreted in an illustrative and not in a limiting sense.

What is claimed is:

1. A time-to-amplitude converter system, for converting the time interval between sequentially occurring first and second input signals to a voltage proportional to said time interval, comprising:
   a constant current source, a capacitor and first normally closed electronic switch means connected in series circuit;
   second normally closed electronic switch means effectively connected to shunt said capacitor;
   first input means operatively connected to said second electronic switch means and adapted to be actuated by said first input signal to produce a start signal to open said second electronic switch means to permit said constant current source to charge said capacitor;
   second input means operatively connected to said first input means and to said first electronic switch means and adapted to be actuated only by the simultaneous occurrence at some time of said start signal and said second input signal to produce a stop signal to open said first electronic switch means to stop charging of said capacitor, the voltage on said capacitor then being proportional to said time interval;
   means having a high input impedance connected across said capacitor for analog storage of said voltage on said capacitor;
   output means;
   gate circuit means interposed between said output means and the output of said high input impedance means;
   first timing means interposed between said second input means and said gate circuit means and adapted to actuate said gate circuit after a time delay for a first time interval in response to said stop signal to permit transmission of said voltage to said output means; and
   reset logic means interposed between said first timing means and said first and second input means and adapted when actuated, to produce a reset signal to drive said first and second input means to reset, said first and second input means also being adapted to revert to their original unactuated states upon termination of said reset signal; said first timing means also adapted to prevent actuation of said reset logic means during said first time interval.

2. A time-to-amplitude converter system as in claim 1 further comprising overflow detection means interposed between said reset logic means and said high input impedance means, said overflow detection means being adapted to actuate said reset logic means in the absence of a timely second input signal.

3. A time-to-amplitude converter system as in claim 2 further comprising voltage sensing means interposed between said capacitor and said reset logic means, said voltage sensing means being adapted to sense a voltage on said capacitor and in response thereto and in cooperation with said reset logic means only to hold said first and second input means in reset states to which they have been previously driven.

4. A time-to-amplitude converter system as in claim 3 further comprising second timing means interposed between said first timing means and said reset logic means and adapted to be actuated by said first timing means upon termination of said first time interval and to actuate said reset logic means for a second time interval.

5. A time-to-amplitude converter system as in claim 4 further comprising output gate means connected to said first input means and to said reset logic means and adapted to be actuated by an output signal from said first input means, and to be held actuated by an output signal from said reset logic means, to produce an output signal for controlling other equipment operatively associated with said system.

6. A time-to-amplitude converter system as in claim 5 further comprising third input means connected to said reset logic means and adapted to actuate said reset logic means in response to a control signal received from other equipment operatively associated with said system.

7. A time-to-amplitude converter system, for converting the time interval between sequentially occurring first and second input signals to a voltage proportional to said time interval, comprising:
   a constant current source, a capacitor and a first normally conducting transistor, of a first pair of transistors connected as a current switching pair, connected in series circuit;
   a normally enabled operational amplifier connected to clamp the potential at one plate of said capacitor to the potential at the other plate of said capacitor and having a second normally conducting transistor in its feedback loop;
   first input means connected to the base of said second transistor and adapted to be actuated by said first input signal to produce a start signal capable of driving said second transistor to cut off to disable said operational amplifier to unclamp the plates of said capacitor to permit said constant current source to charge said capacitor; and
   second input means operatively connected to said first input means and to the normally non-conducting transistor of said first pair of transistors and adapted to be actuated only by the simultaneous occurrence at some time in time of said start signal and said second input signal to produce a stop signal capable of driving said normally non-conducting transistor of said first pair of transistors into full conduction and said first transistor of said first pair of transistors to cut-off to open the circuit between said constant current source and said capacitor to stop charging of said capacitor, the voltage on said capacitor then being proportional to said time interval.

8. A time-to-amplitude converter system as in claim 7 further comprising an amplifier having a high input impedance connected across said capacitor for analog storage of said voltage on said capacitor.

9. A time-to-amplitude converter system as in claim 8 further comprising:
   output amplifier means;
   a gate circuit connected between said output amplifier means and the output of said high input impedance amplifier; and
   first timing means comprising a delay circuit and a gate timer interposed between said second input means and said gate circuit, said delay circuit being adapted to delay transmission of said stop signal to said gate timer and said gate timer being adapted, when actuated by said delayed stop signal, to actuate said gate circuit for a first time interval to permit transmission of said voltage to said output amplifier means.

10. A time-to-amplitude converter system as in claim 9 further comprising a reset OR circuit interposed between said gate timer and said first and second input means and adapted, when actuated, to produce a reset signal to drive said first and second input means to reset, said first and second input means also being adapted to revert to their original unactuated states upon termination of said reset signal.

11. A time-to-amplitude converter system as in claim 10 in which said gate timer is also adapted to prevent actuation of said reset OR circuit during said first time interval.

12. A time-to-amplitude converter system as in claim 11 further comprising a normally cut-off transistor circuit interposed between the output of said high impedance amplifier means and said reset OR circuit, said transistor circuit being adapted to be driven more and more into conduction as the output of said amplifier means increases in the absence of a timely stop signal and to actuate said reset OR circuit at a predetermined output level of said amplifier means.

13. A time-to-amplitude converter system as in claim 12 further comprising a transistor circuit interposed between said capacitor and said reset OR circuit, said transistor circuit being adapted to sense a voltage on said capacitor and in response thereto only to hold said reset OR circuit actuated if said reset OR circuit has been previously actuated.

14. A time-to-amplitude converter system as in claim 13 further comprising a second timer interposed between said gate timer and said reset OR circuit and adapted to be actuated by said gate timer upon termination of said first time interval and to actuate said reset OR circuit for a second time interval.

15. A time-to-amplitude converter system as in claim 14 further comprising an emitter follower reset amplifier interposed between the output of said reset OR circuit and each of said first and second input means.

16. A time-to-amplitude converter system as in claim 15 in which said first input means comprises a tunnel diode and associated circuitry adapted to switch said tunnel diode from its normally "off" state to its "on" state in response to said first input signal and to switch said tunnel diode from its "on" state to a voltage below its "off" state voltage in response to a reset signal received from its associated emitter follower reset amplifier.

17. A time-to-amplitude converter system as in claim 16 in which said second input means comprises a tunnel diode and associated circuitry adapted to switch said tunnel diode from its normally "off" state to its "on" state in response to the simultaneous occurrence of said start signal and said second input signal and to switch said tunnel diode from its "on" state to a voltage below its "off" state voltage in response to a reset signal received from its associated emitter follower reset amplifier.

18. A time-to-amplitude converter system as in claim 17 further comprising an output gate circuit connected to said first input means and to said reset OR circuit and adapted to be actuated by an output signal from said first input means, and to be held actuated by an output signal from said reset OR circuit, to produce an output signal for controlling other equipment operatively associated with said system.

19. A time-to-amplitude converter system as in claim 18 further comprising a transistor circuit connected to said reset OR circuit and adapted to actuate said reset OR circuit in response to a control signal received from other equipment operatively associated with said system.

References Cited

UNITED STATES PATENTS

| | | | |
|---|---|---|---|
| 3,230,400 | 1/1966 | Blue | 307—88.5 |
| 3,231,728 | 1/1966 | Kusto | 330—85 X |
| 3,267,425 | 8/1966 | Aver | 330—110 X |

OTHER REFERENCES

Picciano et al., "Electronic Integration System for Low Level Fast Signals." IBM Technical Disclosure Bulletin, vol. 4, No. 12, pp. 105 and 106, May 1962.

JOHN KOMINSKI, *Primary Examiner.*

LAWRENCE J. DAHL, *Assistant Examiner.*

U.S. Cl. X.R.

332—9